Patented June 21, 1932

1,864,185

UNITED STATES PATENT OFFICE

LUDWIG J. CHRISTMANN, OF JERSEY CITY, AND DAVID W. JAYNE, JR., OF ELIZABETH, NEW JERSEY, ASSIGNORS TO AMERICAN CYANAMID COMPANY, OF NEW YORK, N. Y., A CORPORATION OF MAINE

METHOD OF AND COMPOSITION FOR PRESERVING SUBSTANCES

No Drawing. Application filed January 13, 1931. Serial No. 508,548.

This invention relates to the preservation of substances which are subject to deterioration by exposure to light, or air, or oxygen.

Many substances, particularly of organic nature, deteriorate rapidly upon being exposed to light or air. For example, rubber compositions upon exposure to light become brittle and have a tendency to crack. Oils, especially unsaturated, upon exposure to air absorb oxygen and change their characteristics. Certain organic compounds under the influence of light and air, undergo chemical changes, causing resinification and other undesirable changes.

For the purpose of the present invention we may classify the compounds which deteriorate under the above mentioned conditions as first, organic bases containing nitrogen, including tertiary nitrogen compounds in which the nitrogen is part of a ring, and second, unsaturated organic compounds, such as aldehydes, hydrocarbons, acids and fats or oils, which are subject to deterioration by light or oxygen, or both. As examples of organic compounds coming under these two classes are the following:

1. Di-substituted guanidines, such as di-phenyl-guanidine, di-orthotolyl-guanidine, di-metaxylyl guanidine.
2. Alkaloids, such as nicotine, chincona, quinine.
3. Hydrocarbons, such as rubber.
4. Aldehydes, such as phenyl acetaldehyde.
5. Fats and oils, such as castor oil.

We have discovered that the deteriorating effect of light or oxygen or both upon organic compounds of the classes and character above set forth may be eliminated or minimized by the addition to such compounds of anthranilic acid derivatives or substitution products thereof, compounds or compositions containing anthranilic acid, salts thereof, either metallic or organic, and in short any compounds containing the anthranilic acid group.

We have found that the addition of a relatively small proportion of such anthranilic acid compounds has the desired effect of preventing deterioration. Usually the amount of anthranilic acid compound added to the sensitive organic compound is from 1 to 20 per cent of such compound. The amount depends upon the character of the organic compound to be protected, the conditions of use of the compound and the sensitiveness thereof to deterioration.

Among the anthranilic acid compounds which we have tested are the following: phenyl-anthranilic acid, dinitrophenyl anthranilic acid, toluolsulfo anthranilic acid, naphthalenesulfo anthranilic acid, methyl anthranilic acid, acetyl anthranilic acid, anthranilic acid, o-tolyl anthranilic acid, p-tolyl anthranilic acid, m-xylyl anthranilic acid, b-naphthyl anthranilic acid, benzyl anthranilic acid.

Not only are anthranilic acids suitable for our purpose, but salts thereof both of inorganic and organic nature are also suitable. In certain cases where the organic compounds to be protected are basic in their character, we may utilize the compound formed by the neutralization of the anthranilic acid by the organic base for its protective effect. For example, we may add sufficient phenyl anthranilic acid to di-phenylguanidine to cause the formation of the di-phenylguanidine salt of phenyl anthranilic acid. Or, if desired, a deficiency of the anthranilic acid may be used so that the final composition contains not only the di-phenylguanidine phenyl anthranilic acid salt, but also free di-phenylguanidine.

We have above set forth a number of types of compounds which are stabilized by various anthranilic acid compounds, but our invention is not specific to merely the exact compounds named. We have merely indicated by the number of examples given that our invention is of a broad nature and these examples are to be taken as illustrative of the invention, rather than limiting the scope thereof, which is set forth in the claims appended hereto.

What we claim is:

1. A method of stabilizing organic compounds subject to deterioration by light or oxygen which comprises adding thereto a compound containing the anthranilic acid group.

2. A method of stabilizing organic compounds subject to deterioration by light or oxygen which comprises adding thereto a substituted anthranilic acid.

3. A method of stabilizing organic compounds subject to deterioration by light or oxygen which comprises adding thereto an organic substituted anthranilic acid.

4. A method of stabilizing organic compounds subject to deterioration by light or oxygen which comprises adding thereto an aromatic substituted anthranilic acid.

5. A method of stabilizing organic compounds subject to deterioration by light or oxygen which comprises adding thereto a phenyl substituted anthranilic acid.

6. A method of stabilizing organic compounds subject to deterioration by light or oxygen which comprises adding thereto a tolyl-substituted anthranilic acid.

7. A method of stabilizing organic compounds subject to deterioration by light or oxygen which comprises adding thereto o-tolyl-anthranilic acid.

8. A method of stabilizing organic compounds subject to deterioration by light or oxygen which comprises adding thereto acetyl anthranilic acid.

9. A method of stabilizing organic compounds subject to deterioration by light or oxygen which comprises adding thereto b-naphthly anthranilic acid.

10. A composition of matter containing an organic compound subject to deterioration by light or oxygen and a compound containing the anthranilic acid group.

11. A composition of matter containing an organic compound subject to deterioration by light or oxygen and a substituted anthranilic acid.

12. A composition of matter containing an organic compound subject to deterioration by light or oxygen and an organic substituted anthranilic acid.

13. A composition of matter containing an organic compound subject to deterioration by light or oxygen and an aromatic substituted anthranilic acid.

14. A composition of matter containing an organic compound subject to deterioration by light or oxygen and a phenyl substituted anthranilic acid.

15. A composition of matter containing an organic compound subject to deterioration by light or oxygen and a tolyl substituted anthranilic acid.

16. A composition of matter containing an organic compound subject to deterioration by light or oxygen and o-tolyl anthranilic acid.

17. A composition of matter containing an organic compound subject to deterioration by light or oxygen and acetyl anthranilic acid.

18. A composition of matter containing an organic compound subject to deterioration by light or oxygen and b-naphthyl anthranilic acid.

19. A composition of matter containing an organic base having an amino group and a compound containing the anthranilic acid group.

20. A composition of matter containing an organic base having nitrogen in tertiary form in a ring and a compound containing the anthranilic acid group.

21. A composition of matter containing an unsaturated organic compound and a compound containing the anthranilic acid group.

In witness whereof we have hereunto subscribed our names this 10th day of January 1931.

LUDWIG J. CHRISTMANN.
DAVID W. JAYNE, Jr.